US006387179B1

(12) United States Patent
Anderson et al.

(10) Patent No.: US 6,387,179 B1
(45) Date of Patent: May 14, 2002

(54) METHOD AND DEVICE FOR IMPREGNATING FIBER BUNDLES WITH RESIN

(75) Inventors: Roger A. Anderson, Henrietta; Thomas J. Walsh, Houston; Charles P. Peterman, Houston; Harris A. Reynolds, Jr., Houston, all of TX (US)

(73) Assignee: Hydril Company, Houston, TX (US)

( * ) Notice: Subject to any disclaimer, the term of this patent is extended or adjusted under 35 U.S.C. 154(b) by 0 days.

(21) Appl. No.: 09/100,274

(22) Filed: Jun. 19, 1998

Related U.S. Application Data
(60) Provisional application No. 60/050,586, filed on Jun. 24, 1997.

(51) Int. Cl.[7] ............................................... B05C 11/02
(52) U.S. Cl. ......................... 118/125; 118/420; 118/411
(58) Field of Search .................................. 118/125, 420, 118/404, 411, 405; 425/114

(56) References Cited

U.S. PATENT DOCUMENTS

| | | | |
|---|---|---|---|
| 4,259,379 A | * | 3/1981 | Britton et al. |
| 4,588,538 A | | 5/1986 | Chung et al. ............... 264/29.2 |
| 4,957,422 A | * | 9/1990 | Glemet et al. |
| 5,073,413 A | | 12/1991 | Koppernaes et al. ........ 427/356 |
| 5,176,775 A | * | 1/1993 | Montsinger .................. 118/420 |
| 5,447,793 A | * | 9/1995 | Montsinger .................. 118/420 |

FOREIGN PATENT DOCUMENTS

| | | |
|---|---|---|
| DE | 3824181 A1 | 2/1989 |
| EP | 0 287 427 A1 | 10/1988 |
| EP | 0 712 716 A1 | 5/1996 |
| EP | 0 718 089 A1 | 6/1996 |
| GB | 1 206 946 | 9/1970 |
| WO | WO 90/03877 | 4/1990 |

OTHER PUBLICATIONS

International Search Report, Aug. 10, 1998, 5 pages.

* cited by examiner

Primary Examiner—Brenda A. Lamb
(74) Attorney, Agent, or Firm—Rosenthal & Osha L.L.P.

(57) ABSTRACT

Resin impregnation of fiber bundles for use in making a composite material is described. The impregnated fiber bundles are suitable for use as a prepreg tape or for inline use in extrusion, pultrusion and filament winding operations. The improvements of the disclosed method and impregnation head enable high fiber take-off speeds without excessive damage or fraying of the fiber bundles. Encapsulated air or voids in the impregnated product are consistently less than 1% by volume of the impregnated product and decrease with increased take-off speed. These improvements are achieved by passing the fiber bundles through a multi-chambered impregnation head in which the resin is injected into a downstream chamber. The cross sectional area of the fiber bundles, the velocity of the fibers bundles, the size of the openings to the chamber, the viscosity of the resin and the pressure at which the resin is pumped into the downstream chamber all control the pressure within the downstream chamber. The pressure is adjusted so that the resin flows upstream against the movement of the fiber bundles and sets up a wall of resin in the upstream chamber. The wall of resin minimizes the air that is encapsulated with the resin and prevents air from entering the downstream chamber. The pressures and counter flow of resin within the impregnation head drives encapsulated air out of the resin.

27 Claims, 4 Drawing Sheets

METHOD AND DEVICE FOR IMPREGNATING FIBER BUNDLES WITH RESIN

This application claims the benefit of the filing date of U.S. Provisional Patent Application No. 60/050,586, filed Jun. 24, 1997.

STATEMENT AS TO FEDERALLY SPONSORED RESEARCH

The U.S. Government has a paid-up license in this invention and the right in limited circumstances to require the patent owner to license others on reasonable terms as provided for by the terms of Award #70NANB5H1053 awarded by the Department of Commerce, National Institute of Standards and Technology—Advanced Technology Program.

BACKGROUND OF THE INVENTION

This invention relates to the manufacture of composite materials. More particularly, the invention relates to manufacture of composites made of reinforcing fibers imbedded in a curable resin.

Traditionally, fiber bundles have been impregnated with a selected resin by drawing bundles of the fiber through an open bath containing the resin in solution and then subjecting the wetted fiber bundles to a curing process. However, there are several difficulties associated with an open bath type impregnation process. These difficulties include the formation of voids when air is trapped between the resin and the fibers, encapsulation rather than impregnation of the fibers by the resin, entrainment of air in the resin solution, the hazardous conditions created by the use of highly volatile solvents, slow fiber bundle take-off speeds and the lack of control over the fiber to resin content of the product.

Alternatively, resin impregnation can be accomplished in an enclosed chamber to contain the volatile solvent compounds and to prevent air from being entrained in the resin bath solution. However, the use of an enclosed chamber does not prevent the formation of voids that detract from the quality of the composite product. Further, the use of an enclosed bath alone does not provide any additional control over the ratio of fiber to resin in the final product. Additional developments that have been intended to overcome these latter difficulties include the use of rollers and tapered openings to compress the resin into the fiber bundles. Further, enclosed bath type systems have been modified to be operated under reduced pressure to facilitate the removal of air that might otherwise be entrapped and create voids in the cured product.

The prior art has attempted to remove encapsulated air pockets from the impregnated fiber bundles through the manipulation of the pressure on those bundles and various mechanical means for pressing the resin into the bundles. As noted above, several attempts have been made to impregnate the fiber bundles under vacuum so that less air is available for creating voids. Further rollers have been used to press excess resin into the fiber bundles.

Japanese Patent Application Number 51039769, entitled "Fiber Reinforced Plastic Mouldings" and Japanese Patent Specification Number 52117966, entitled "Fiber Bundles Continuous Impregnation with Resin" both disclose the use of a enclosed resin bath that is operated under reduced pressure. The fiber bundles are drawn into the enclosure and redirected through the resin bath by guide rollers. These disclosures emphasize the use of rollers for pressing excess resin into the fiber bundles. The impregnated fiber bundles are then drawn out of the enclosure through a thin slot which maintains the vacuum and removes excess resin. A primary difficulty with these types of systems is that the physical manipulation of the fiber bundles during impregnation, whether through the use of guide rollers or contact between the fiber bundles and the walls of a narrowed opening, causes breakage and or fraying of the fibers. Broken and frayed fibers are to be avoided since they will foul and clog an impregnation device requiring significant operational down time during cleaning and system preparation. In addition, damaged fiber bundles will not be uniform and will produce a poor quality composite material. Therefore, it is preferred to minimize, and if possible to eliminate, contact with or manipulation of the fiber bundles during their impregnation.

Another prior art device which uses reduced pressure to prevent or remove air pockets from the impregnated resin is disclosed in Japanese Patent Application Number [Kokai] 2-208021, entitled "Method of Manufacturing Fiber-Reinforced Plastic Forming Materials." A view of the device of this application is shown in FIG. 1. This application describes the use of multiple chambers in which the fiber bundles are in sequence subjected to heating, vacuum, a tapered slit and resin impregnation of the top half of the fiber bundles followed by repeated applications of vacuum, a tapered slit and resin impregnation of the bottom half of the bundles. The tapered openings have increasingly larger cross sectional areas as the impregnated fiber bundles pass downstream. The final tapered opening is used to determine the final amount of resin on the fiber bundles. It is claimed that perfect impregnation can be achieved by the method of impregnating the top and bottom halves of the fiber bundles separately and applying a pressure reduction treatment after each impregnation. However, it has been found that the use of reduced pressure treatments is less than satisfactory at achieving void-free resin impregnated fiber bundles, particularly at high fiber take-off rates. Rather, it has been discovered through the present invention that it is preferable to use positive pressure prior to and during resin impregnation to prevent and eliminate voids in the fiber bundles.

German Patent Application No. DE 2 824 376, entitled "Method of Impregnating Fibers," discloses an enclosed resin bath. As shown in FIG. 3, degassed resin is pumped into the bath from below the fiber bundles. The fiber bundles are directed into and through the resin on guide rolls. Further, the fiber bundles are drawn through three downstream-tapering conical dies that compress the impregnated resin and encapsulated air. According to the specification of DE 2 824 376, encapsulated air "explosively" escapes as the fiber bundles exit the conical dies ripping the fiber bundles apart. Resin is pumped from the top of the bath and filtered to remove the air and free fibers before re-injection at inlets located upstream and below each of the conical dies. The impregnated fiber bundles are passed through a stripping die as they exit the resin bath housing.

Although DE 2 824 376 is directed at eliminating air pockets from the impregnated fiber bundles it does not address or attempt to prevent air from becoming entrapped. The use of guide rollers and stripping dies result in unnecessary contact with the impregnated fiber bundles that will damage the integrity of the bundles. Further, the use of the tapered structures to cause an "explosive" release of entrapped air will likewise cause damage to the bundles that will foul the stripping die and contaminate the resin bath.

Not unlike DE 2 824 376, German Patent Application No. D 4 121 200, entitled, "Method of Impregnating Fibers"

describes using tapered slots to create an initial pressure on the fiber bundles that is quickly released in order to release entrapped air. Shown in FIG. 2, DE 4 121 200 discloses a channel with a succession of tapered dies. The specification of DE 4 121 200 emphasizes that excessive pressure on the fiber bundles should be avoided to prevent breaking or otherwise damaging the fibers. Resin outlets between the dies provide means of releasing excess pressure by drawing excess aerated resin and loose fibers out of the channel. The resin and loose fibers are filtered and re-injected prior to the first tapered die. The specification asserts that air entrained with the resin escapes from the channel at the fiber inlet as the resin is re-injected into the channel. The last tapered die strips excess resin to control the final amount of resin that remains on the fiber bundles.

The disclosure of DE 4 121 200 does not suggest any means for preventing air from being encapsulated in the resin initially. To the contrary, it is doubtful that all of the air entrained in the recirculating resin will be given off at the fiber inlet as is suggested and that therefore, the device will re-inject aerated resin into the channel to be re-encapsulated with the fiber bundles. Secondly, the reliance on physical contact with the impregnated fiber bundles such as with a stripping die will have undesirable results on the integrity of the fiber bundles and the reliability of the impregnation apparatus.

European Patent Specification EP 0 542 709, entitled "Method and Apparatus For Making Composite Materials," discloses preheating the fiber bundles, separating them using a floating mandrel, injecting resin around the separated fibers and then passing the fibers and resin through a tapered section to create a pressure head on the impregnated fibers. The reference claims that greater wetout and impregnation are achieved due to the pressure head, the heating of the fibers and the capillary action of the fibers. Further, although the reference emphasizes the creation of a pressure head on the fibers, it also asserts that resin injection should be controlled so that excess resin does not flow upstream from the impregnation chamber. In fact, the application claims that a seal should be located at the entrance to the impregnation chamber to prevent a back flow of resin out of the impregnation chamber.

EP 0 542 709 does not address the prevention or elimination of air voids but rather is directed at obtaining faster resin impregnation of the fibers. Although faster take-off speeds may be achieved by separating and manipulating the fibers with a floating mandrel and compacting them prior to impregnation, such handling of the fibers is unnecessary and is accompanied by excessive damage and fraying of the fiber bundles.

It has been found that voids can be reduced or eliminated without the use of complex vacuum systems and their interfering seals by using high pressure treatments such as with the use of rollers that can compress excess resin into the fiber bundles. Tapered structures and venturi-like structures have also been used in the art to compress the resin and air into the fiber bundles before abruptly releasing that pressure so that encapsulated air escapes the resin and fiber bundles violently, thereby removing the air and separating the fiber for impregnation. Nevertheless, as has been noted above, mechanical means such as the use of guide rollers and stripping dies that manipulate the fiber bundles during their impregnation and the use of structures designed to cause a violent release of air from the fiber bundles, should be avoided in order to maintain the integrity of the fiber bundles and the reliability of the impregnation apparatus. It is also evident that although these developments are directed at eliminating encapsulated air from resin impregnated fiber bundles, there does not appear to have been any development directed at preventing the air from being encapsulated between the fiber bundles and resin.

SUMMARY OF THE INVENTION

In some aspects, the invention relates to an apparatus for impregnating fiber bundles with resin which includes a resin impregnation head. The impregnation head comprises an upstream, tapered chamber which receives a fiber bundle through a fiber inlet and conveys it to an orifice. The orifice is rectangular with an adjustable cross sectional area where the fiber bundle fills 45%–70% of the area. The fiber bundle is pulled through the orifice to a downstream, tapered chamber and conveyed to a fiber outlet. The fiber outlet with an adjustable cross sectional area which is equal to the cross sectional area of the orifice. Two resin conduits are located immediately downstream of the orifice which direct a resin flow at an acute angle in relation to the fiber bundle.

In an alternative embodiment, the resin impregnation head further comprises tapered chambers which receive a fiber bundle wound around a mandrel, through a fiber inlet and conveys it to an orifice on through to a fiber outlet. The rectangular orifice has an adjustable cross sectional area of where the fiber bundle and mandrel fill 45%–70% of the cross sectional area. An inflatable, resilient member is located between the upstream and downstream chamber which does not physically contact the fiber bundle. Another inflatable, resilient member is located at the fiber outlet which does not physically contact the fiber bundle.

In an alternative embodiment, the invention relates to a method for impregnating fiber bundles with resin which comprises injecting a resin into a downstream chamber of a resin impregnation head comprising a fiber inlet, an upstream chamber, an orifice, a downstream chamber, and a fiber outlet. Next, an equilibrium of resin flow is established which minimizes the resin seepage from the fiber inlet and fiber outlet, such that the resin fills the downstream chamber and forms a resin wall within a partially filled upstream chamber. The equilibrium is established by adjusting the velocity of the fiber bundles to 0.5–20.0 ft./min., the viscosity of the resin to 100–1000 centipoise, the pressure of the resin injection to 10–150 psi, and the ratio of the cross sectional area of the orifice and the cross sectional area of the fiber outlet to 1:1. Finally, a fiber bundle is drawn into the fiber inlet through the upstream chamber and the resin wall to the orifice, and drawing the fiber bundle through the orifice into the downstream chamber, and out of the fiber outlet.

In an alternative embodiment, the method for impregnating fiber bundles with resin further comprises drawing a fiber bundle wound around a mandrel into the fiber inlet through the upstream chamber and the resin wall to the orifice and through the orifice into the downstream chamber, and out of the fiber outlet.

Advantages of the invention may include one or more of the following: a resin impregnation device and method that utilize high pressure to prevent and eliminate air pockets and voids in the resin impregnated fiber bundles and to achieve a more complete wet-out of continuous fiber bundles. It is essential however, that these high pressure treatments be accomplished with minimal manipulation or contact with the fiber bundles so as to achieve high speed impregnation and high uniformity in the product while preserving the integrity of the fiber bundles and the reliability of the impregnation apparatus.

The present invention uses a resin filed impregnation chamber that is free of air and other gases and that is maintained under positive pressure. The pressure within the impregnation chamber is sufficient to create a back flow of resin that is directed upstream against the movement of the fiber bundles. A "wall" of resin is maintained upstream from the impregnation chamber to minimize the air that is trapped between the resin and the fiber bundles and to prevent air from entering the high pressure impregnation chamber.

DESCRIPTION OF THE PREFERRED EMBODIMENTS

Like elements are represented by like numbers throughout the following description. Further, the fiber bundles to be used in practicing the present invention may be made of a variety of materials including glass, carbon, synthetic, ceramic, metal or most any material that may be drawn into a flexible fiber. In addition, the form of these fibers may be long continuous bundles known as tows or yarns. The tows used may be of a single bundle or multiple bundles that have been woven, braided, intertwined or otherwise agglomerated. Non-continuous fibers may include chopped fibers that have been aggregated into a mat. Although fibers in any of these forms may be impregnated with resin using the features of the present invention, for purpose of the following description and claims, all of these types and forms of fibers will be generally referred to as the fiber bundles.

Once impregnated with resin, the fiber bundles could be used in virtually any procedure for making a fiber reinforced composite including but not limited to extrusions, pultrusions and filament winding operations. The invention is particularly useful in manufacturing a pre-impregnated resin tape for use in these types of operations and for making composites with elongated continuous fiber bundles.

Figure 1:
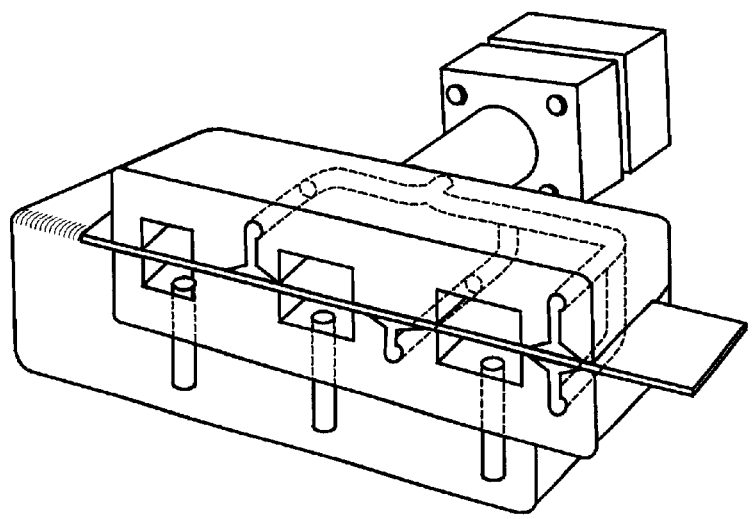
FIG. 1 is a prior art device that uses vacuum techniques to eliminate encapsulated air and then separately impregnates the top and then the bottom half of the fibers.
Figure 2:
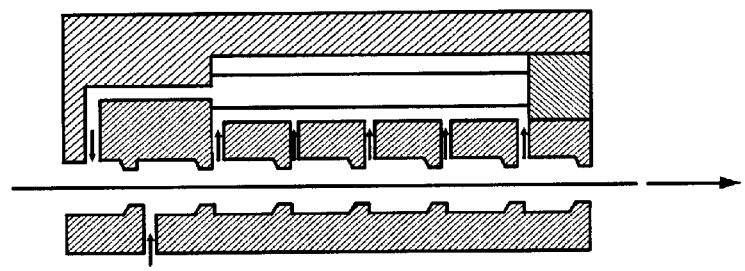
FIG. 2 is a prior art device that shows a succession of tapered dies for first compressing air and resin into the fiber and then abruptly releasing the pressure to explosively release the entrapped air.
Figure 3:
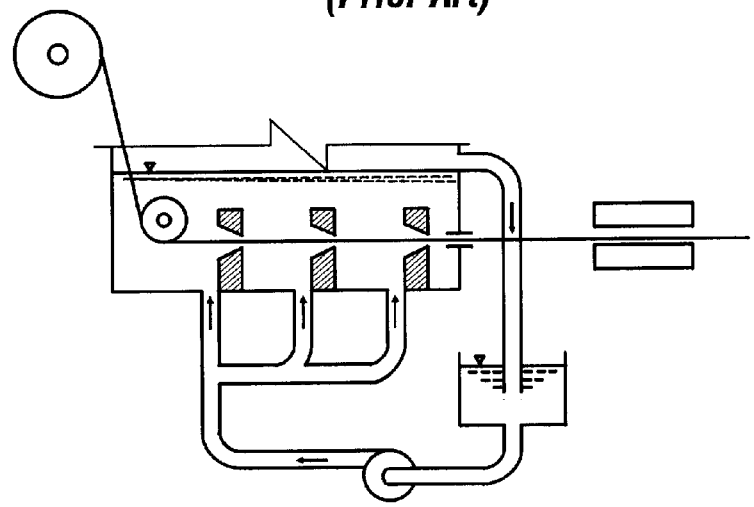
FIG. 3 is a prior art device having an enclosed bath and a series of tapered dies for first compressing air and resin into the fiber bundle and then releasing the pressure to explosively release the entrapped air.
Figure 4:
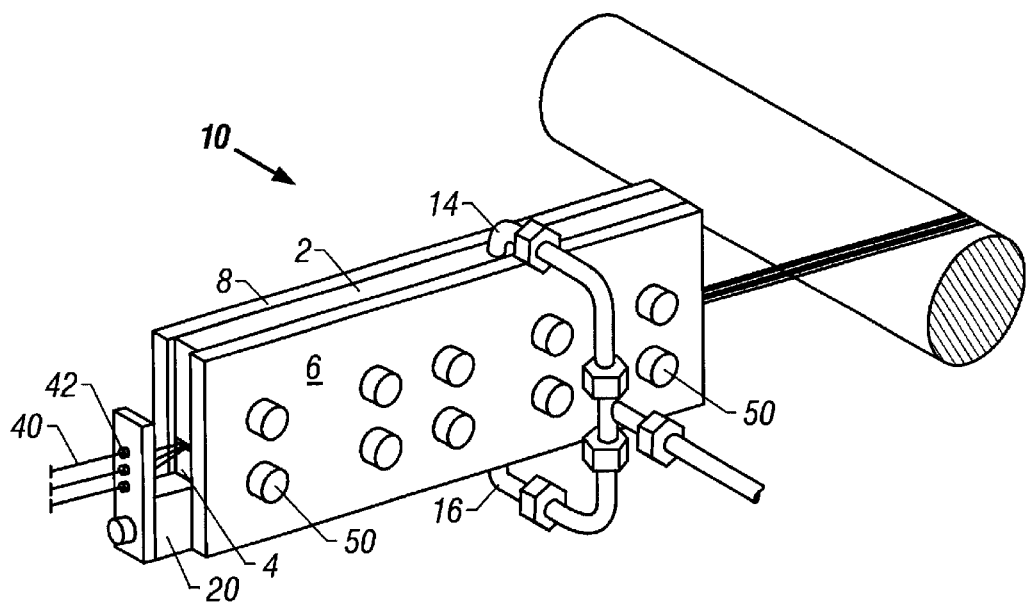
FIG. 4 is a perspective view of an embodiment of the present invention showing an impregnation head with resin inlets feeding resin to the top and bottom portions of the head.
Figure 5:
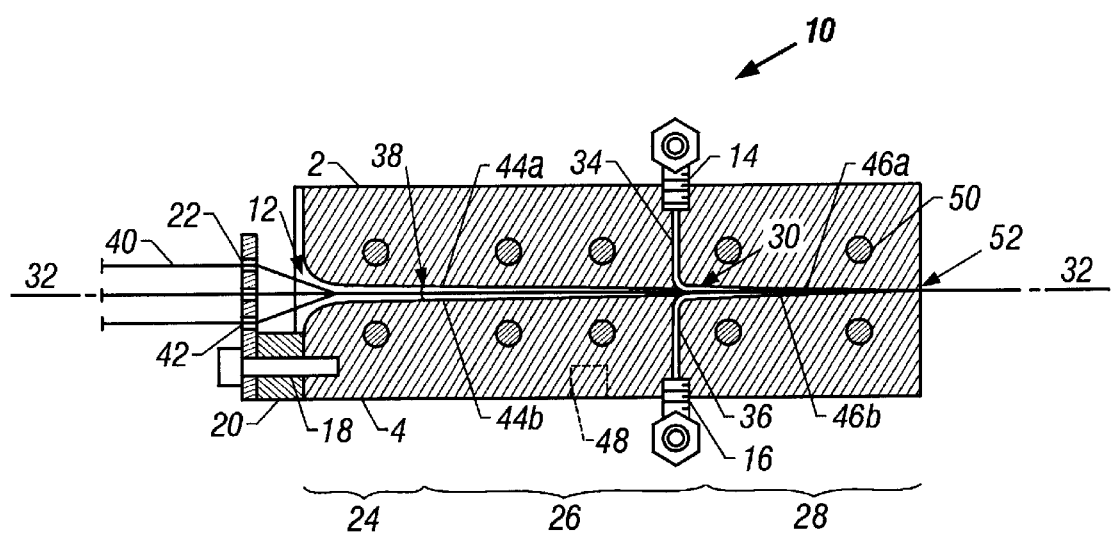
FIG. 5 is a vertical cross sectional view of the impregnation head.
Figure 6:
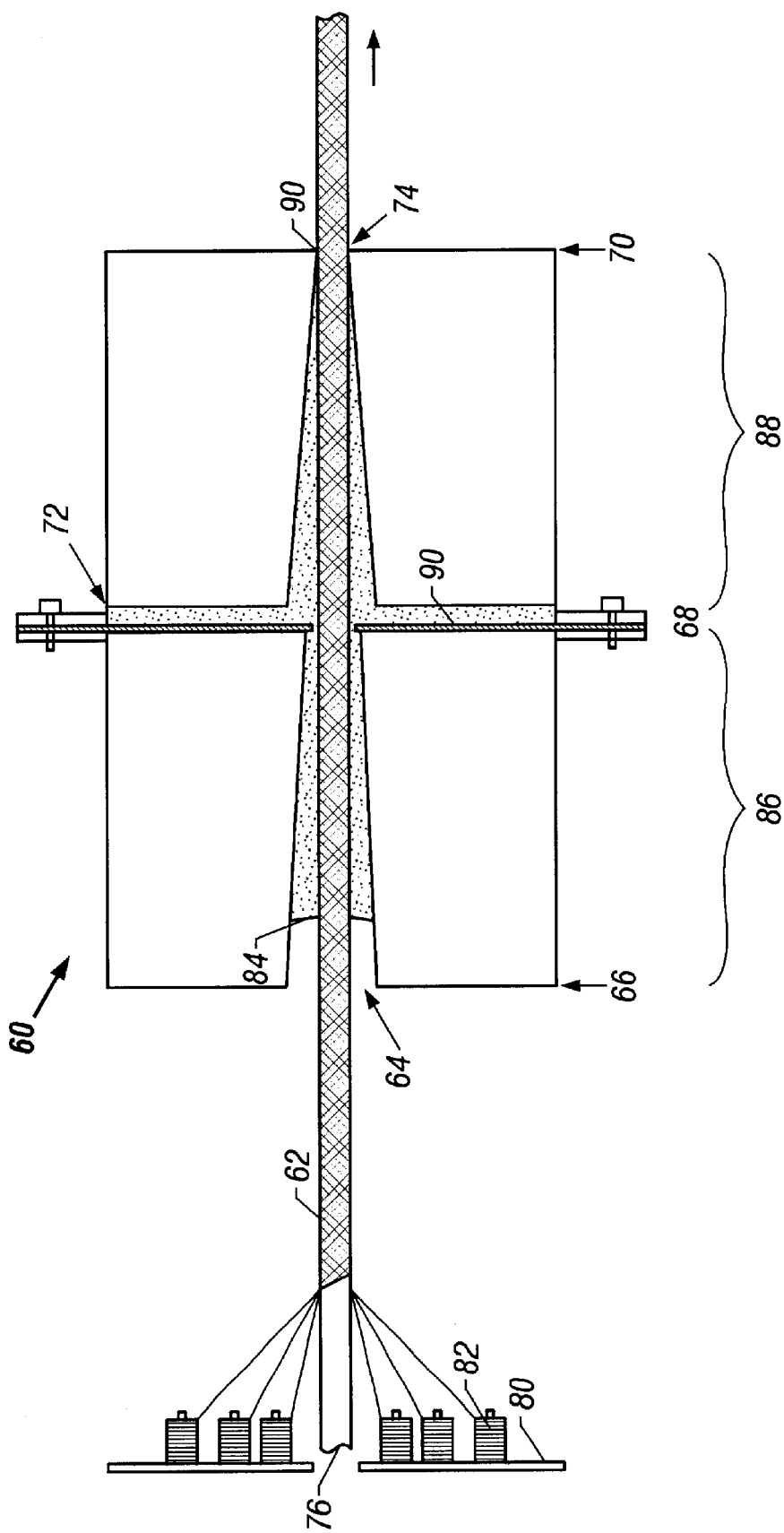
FIG. 6 is a cross sectional view of a cylindrical resin impregnation head.

FIG. 4 shows a perspective view of a resin impregnation head of the present invention generally at reference number 10. As shown in FIG. 4, the impregnation head is a sandwich of top plate 2 and bottom plate 4 mounted between side plates 6 and 8. Impregnation head 10 is held together by multiple mounting bolts 50. Top and bottom plates 2 and 4 are provided with resin inlets 14 and 16 respectively so that a flow of resin is introduced into the head and onto the fibers simultaneously from above and below the fibers. As shown in FIG. 5, bottom plate 4 is also provided with female connections 48 and 18 for mounting the impregnation head and for connecting fiber guide assembly 20 to the impregnation head near fiber inlet 12. Because of the sandwich design of impregnation head 10, the impregnation head can accommodate fiber bundles of various cross sectional areas by adjusting the size of the passages between the top and bottom plates and correspondingly, the chamber openings between those plates. Adjustment of the top and bottom plates is described in more detail below.

As noted above, there are no known limitations on the types of fibers that can be impregnated in impregnation head 10. Although carbon fibers are generally regarded as one of the more difficult fibers to handle because of their delicate nature, it has been found that they work equally well as glass and synthetic fibers provided some additional care is taken in directing the carbon fiber bundles into the impregnation head. The processes occurring within the head during fiber impregnation however do not break or otherwise damage the carbon fiber bundles.

The fiber bundles 40 should be maintained under slight tension to prevent slack in the fibers and to prevent the bundles from coming into contact with the interior walls of impregnation head 10. The bundles are gathered together before entering into fiber inlet 12. As shown in FIG. 5, a fiber guide assembly 20 may be mounted to bottom plate 4 for gathering the fiber bundles together and guiding them into the inlet of the impregnation head. Guide assembly 20 is attached to bottom plate 4, and is provided with eyelets 42 in openings 22 to minimize the friction on the bundles. It is anticipated that any means that are known for directing fiber bundles while minimizing contact with the bundles may be used to advantage.

Top plate 2 and bottom plate 4 define a passage therebetween through which the fiber bundles are drawn. The passage is divided into two chambers that are generally referred to as upstream and downstream chambers based on the direction of the moving fibers. The region of the passage that is the upstream chamber is defined by walls 44 while the region of the passage that is the downstream chamber is defined by walls 46. The downstream chamber of the impregnation head is indicated at reference number 28. The upstream chamber of the head is subdivided into resin filled section 26 and fiber set up section 24.

Separating the two chambers is orifice 30, a narrow gap between walls 44 of the upstream chamber. It is preferred that orifice 30 have a generally rectangular cross section, particularly when impregnating fibers during the manufacture of a prepreg tape or ribbon. However, it is anticipated that the top and bottom plates will be machined to accommodate the shape of the fiber bundles and or the desired shape of the impregnated fibers. The area of orifice 30 is first dependent on the cross sectional area of the fiber bundles passing through the impregnation head. In the second instance, the area of orifice 30 is adjustable for controlling the pressure within the downstream chamber. Generally, the cross sectional area of orifice 30 may be adjusted by separating or closing the gap between the top and bottom plates accordingly. Further, the cross sectional areas of orifice 30 and fiber outlet 52 are relatively similar and should have a ratio of about 1:1. However, either opening could be the larger of the two.

In top plate 2, resin inlet 14 is in fluid communication with resin conduit 34. Conduit 34 is a bore through the top plate that directs the flow of resin into downstream chamber 28 and onto the top of fiber bundles 40. Likewise, bottom plate 4 is provided with resin conduit 36 for directing the flow of resin into the downstream chamber and up onto the bottom of the fiber bundles.

A flow of resin is pumped from a source through inlets 14 and 16 to resin conduits 34 and 36. The resin flow from conduits 34 and 36 enters second chamber 28 immediately downstream of orifice 30. It is anticipated that the resin is flow may be directed at any angle relative to the path of the fibers, but as shown in FIG. 5, the resin flow is preferably directed at an acute angle relative to the path of the fibers, downstream toward fiber outlet 52. The flow of resin fills downstream chamber 28 and flows upstream against the movement of the fiber bundles. A dynamic equilibrium is established such that the resin flow partially fills the upstream chamber, resin filled section 26, and forms resin wall 38. The resin flow is set to minimize the excess resin that oozes or seeps from either fiber outlet 52 or fiber inlet 12. The variables that are balanced in establishing the dynamic equilibrium of the resin flow are discussed in detail in connection with the description of the method of the present invention.

The resin introduced into downstream chamber 28 is preferably degassed so that there is no air entrained in the resin flow. Therefore, the only air that can potentially be entrapped or encapsulated is the air at the interface of the atmosphere and resin wall 38, an interface of minor cross sectional area, and the air that is trapped in the interstitial spaces of the fiber bundles.

In the operation of impregnation head 10, the fiber bundles 40 are directed toward the adjacent fiber inlet 12 by fiber guide assembly 20. The fiber bundles are drawn into the upstream chamber of the head through fiber set up section 24 where the fiber bundles are brought together for passage through the head. The cross sectional shape of set up section 24 is determined by the shape of the fiber bundles and or the desired shape of the impregnated fibers. The fiber bundles are under atmospheric pressure in set up section 24.

Fiber bundles 40 pass through resin wall 38 into resin filled section 26 that is maintained upstream from orifice 30. As the fiber bundles pass through the resin filled section, resin attaches to the fiber bundles and begins to permeate into the bundles. Walls 44 are provided with a slight downstream taper such that the cross sectional area of resin filled section 26 becomes constricted as the fibers travel toward orifice 30. This taper compresses the resin and fiber bundles together with the resin serving both as a lubricant and intermediate barrier between walls 44 and fiber bundles 40. It is preferred that there be no contact between the walls of the upstream chamber and the fiber bundles in order to prevent damage or fraying of the bundles.

The taper of walls 44 in the upstream chamber and of walls 46 in the downstream chamber is critical to the pressure that is exerted on the resin and fiber bundles. Generally, the upstream chamber will have a larger volume than the downstream chamber with walls 44 having a steeper wall angle than the wall angle of walls 46. A wall angle refers to the angle between a wall, or a portion of a wall, and the path of the fibers through the impregnation head. It is also anticipated that a wall angle may not be uniform along the full length of a chamber. For instance, the upstream chamber is depicted in Figure S as having an enlarged opening at its inlet for receiving fiber bundles from different directions. Fiber set up section 24 is provided with partially rounded walls wherein the wall angle decreases to a uniform angle somewhat downstream of fiber inlet 12.

Significantly, the pressure on the resin and fiber bundles increases in the upstream chamber as the fibers travel toward orifice 30. Also contributing to the pressure on the fiber and resin in the upstream chamber is a back flow of resin from downstream chamber 28. Without limitation as to other mechanisms for preventing and eliminating voids in the resin, it is believed that the combination of the pressure on and counter flow of resin against the resin and fiber bundles in the upstream chamber drives off encapsulated air and gas. Once separated from the fibers, the formerly entrapped air is free to migrate upstream toward resin wall 38, the region of lower pressure.

The pressure on the resin and fiber bundles in the upstream chamber increases until the bundles emerge from orifice 30 into downstream chamber 28. It is anticipated that there is a slight drop in pressure as the fiber bundles emerge from the orifice. However, due to the proximity of the incoming flow of resin, the pressure at which that flow is introduced and the relatively small cross sectional area of downstream chamber 28 at orifice 30, this pressure drop is not believed to be significant. Therefore, the type of explosive release of encapsulated air and the accompanying damage to the fiber bundles that is well known in the prior art has not been observed with the present invention. The absence of a great release of entrapped air at the pressure drop is also believed to be due to the features of the present invention that minimize the interface between air and resin and thereby prevent a significant amount of air from becoming entrapped initially. Further, air that is entrapped is believed to be removed from the fiber bundles before they reach the inlet to the downstream chamber.

After exiting orifice 30, the flow of resin that is directed into the downstream chamber by the resin conduits 34 and 36 collides with the fiber bundles and the attached resin. As with the upstream chamber, the walls 46 of downstream chamber 28 have a slight downstream taper so that the chamber becomes constricted as the resin and fiber bundles travel toward fiber outlet 52. This constriction compresses the resin and fiber bundles together further impregnating the fibers.

Fiber outlet 52 is sized and shaped to accommodate the desired impregnated fiber product. The cross sectional areas of orifice 30 and outlet 52 are sized to yield the desired fiber to resin ratio in the impregnated product. Although fiber outlet 52 should not be a stripping die or otherwise contact the fibers directly, it does regulate the ultimate fiber to resin ratio in the product. While it is preferred that these openings have the same cross sectional areas, it is to be understood that there are embodiments of the present invention when orifice 30 will be larger than outlet 52 and vice versa. In the preferred embodiment, the ratio of these two openings should be within the range of 0.75–1.5:1.

The resin impregnation method of the present invention passes fiber bundles 40 through a pair of restricted flow areas such as the upstream and downstream chambers shown in FIG. 5. A flow of resin is pumped into the downstream chamber. A pressure is established on the resin and fiber bundles in the downstream chamber so as to cause excess resin to flow upstream against the movement of the fiber bundles. Further, this pressure on the resin and fiber bundles is sufficient to causes the resin to form a fluid resin wall in the upstream chamber that minimizes the air that is encapsulated between the resin and fiber bundles and eliminates the air that is entrapped in the resin.

The void content in the impregnated fiber bundles is controlled by a number of process variables including the cross sectional area of the fiber bundles being impregnated, the fiber take-off or line speed at which the fiber bundles are passed through the impregnation device, the viscosity of the resin, the pressure at which the resin is pumped into the downstream chamber, the relative sizes and shapes of the chambers and the size of the reduced flow area or orifice between the two chambers.

The amount of fiber that is incorporated into the impregnated product is determined based upon desired characteristics of the product and its intended use. Holding all other process variables constant, an increase in the cross sectional area of the fiber bundles will increase the pressure on the resin and fiber bundles in the downstream chamber and tend to cause an increase in the upstream flow of resin.

The take-off or line speed may range from 0.5 feet per minute to in excess of 20 feet per minute. Holding all of the other process variables constant, a slower line speed will result in a lower pressure on the resin and fiber bundles in the downstream chamber and tend to cause a decrease in the upstream flow of resin. Interestingly, it has been found that resin impregnation and the elimination of voids both improve as take-off rates increase and without a corresponding increase in damage to the fiber bundles or fouling of the impregnation device. Generally, in the field of fiber reinforced composites, void contents of less than 5% are considered desirable. Fiber bundles impregnated by means of the method and impregnation head of the present invention have been tested to consistently show void contents of less than 1%.

While the resin used in this method is preferably an epoxy resin, it is anticipated that most any curable resin can be used in the method and apparatus of this invention. The resin selected should have a viscosity that can be adjusted as desired. The viscosity of the resin affects not only the pressure levels within the impregnation head, but more importantly, it affects the ability of the resin to permeate into the fiber bundles. A highly viscous resin may fail to completely impregnate fibers due to the high surface tension of the fluid. Thus, it is preferred that the resin have a viscosity between 100 and 1000 centipoise. Note that because the process variables are interdependent in achieving the desired pressure and counter flow of resin, the desired resin viscosity will depend on the other variables. It should also be noted that because there is only a minor interface between the resin and the atmosphere, volatile resins that might otherwise require the use of an enclosed resin bath or special vacuum techniques may be used to advantage with the present invention without such special handling.

Another variable affecting the pressure on the resin and fiber bundles in the downstream chamber 28 is the pressure at which the resin is pumped into that chamber. It is preferred that the resin flow be maintained at a pressure of between about 10 and about 150 pounds per square inch. Holding the other process variables constant, an increase in the pressure at which the resin is pumped into downstream chamber 28 will tend to cause an increase in the upstream flow of resin into the upstream chamber.

The specific shapes of the two chambers are dictated by the shapes of the fiber bundles and or the shape of the desired impregnated fibers. The relative shapes of the chambers, such as defined by the wall angles of the upstream and downstream chambers, are an additional variable affecting the pressure on the resin and fiber bundles. As detailed in the description of impregnation head 10, downstream chamber 28 has the smaller volume of the two chambers as well as the more constricted cross sectional area along its length. This greater constriction creates greater pressure on the resin and fiber bundles creating a tendency to drive excess resin upstream into the upstream chamber.

Desired product characteristics will also suggest a desirable fiber to resin ratio which is largely governed by the cross sectional area of the downstream reduced flow area, fiber outlet 52. The cross sectional area of the first reduced flow area, orifice 30, contributes not only to the pressure on the resin and fiber bundles in downstream chamber 28, but more importantly, it greatly contributes to the pressure gradient that is established within resin filled 5 section 26 of the upstream chamber. Holding the other variables constant, orifice 30 should be adjusted so that the cross sectional area of the fiber bundles account for between about 45% and about 70% of the area of orifice 30 in order to maintain the desired pressure gradient between resin wall 38 and orifice 30. If the area of orifice 30 is below this range, the upstream flow of resin may be cut off. Alternatively, if the area of orifice 30 exceeds the upper limit of this range, although the upstream flow of resin will continue it may not have sufficient pressure to prevent air encapsulation or eliminate encapsulated air.

It is worth re-emphasizing that the process variables and the recited ranges set out herein are all closely interrelated such that the extreme limits of the cited ranges could be extended beyond those limits if one or more of the other variables were so altered. For instance, with respect to take-off speeds, it is anticipated that the method of this invention could be carried out at speeds exceeding 20 feet per minute if the resin were able to be pumped into the impregnation device at a sufficiently high pressure. Alternatively, a more viscous resin might be used if the other variables could be adjusted to assure sufficient pressure on the resin and fiber bundles.

Although the resin impregnation head described above could be mounted in a stationary position so as to produce a prepreg tape or ribbon, this invention can also be adapted for use on a moving or rotating structure. For instance, the impregnation device of this invention may be mounted proximate rotating fiber spools in order to obtain the benefits of this invention in conducting filament winding operations, wherein both the fiber spools and the impregnation head(s) would rotate about a fixed or axially moving mandrel or work piece.

The benefits of the method of this invention are not believed to be limited to the specific structure of the claimed apparatus. Rather, the improvements in eliminating voids and in increased line speeds without corresponding increases in system fouling or clogging by damaged and frayed fiber bundles are believed to be due to the effects of an increasing pressure gradient that acts on the resin and fiber throughout impregnation. Further, the introduction of resin downstream of a constricted orifice and creating a contra-flow of resin upstream against the movement of the fibers through that orifice is likewise believed to generate these improvements.

Figure 7:
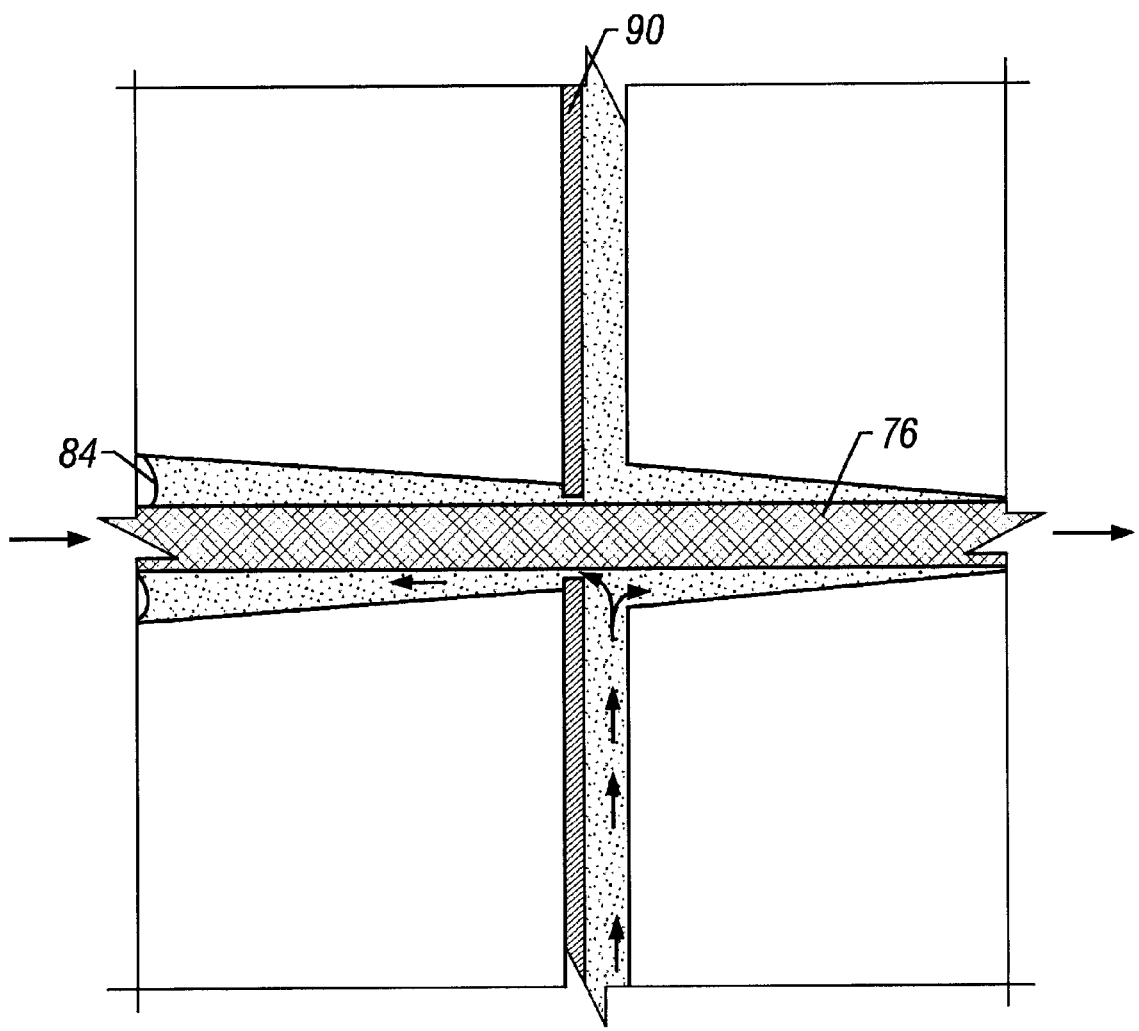
FIG. 7 is a cross sectional view of the impregnation head with an enlargement of the upstream chamber outlet and the downstream chamber inlet.

Thus, it is a further embodiment of the present invention to impregnate fiber bundles having an irregular surface or profile. An irregular surface may be due to the irregular shape or surface of a mandrel about which the fiber bundles are arranged as well as to an irregular profile of the fiber bundles themselves such as encountered with coarse woven rovings. More specifically, it is anticipated that the resin impregnation head and process of the present invention may be adapted for impregnating fiber bundles that have been dry wrapped about a mandrel or some other substrate. As shown in FIG. 7, the resin impregnation head 60 can be enlarged to accommodate a cylindrical mandrel 76 with upstream chamber inlet 64 and downstream outlet 74 sized accordingly. Mandrel 76 is wrapped with dry fiber bundles 62 which are drawn from spools 82. Spools 82 are rotatably mounted to rotating wheel 80. As the mandrel 76 is moved in the direction shown, the fiber bundles 62 are drawn off rotating wheel 80. Although no guidance system is shown for laying the fiber bundles down at a controlled angle, it is anticipated that precise angles will be desired and that fiber guidance systems will be employed with the present invention. Further, it is anticipated that other known methods for laying fiber bundles onto the mandrel's surface may be used with the present invention.

Because mandrel 76 has been wrapped with fiber bundles 62 it is anticipated that it will have a non-uniform profile along its length. The inlets, outlets and passages of the chambers are sufficiently large to provide adequate clearances around the fiber bundles. Therefore, it is further anticipated that resilient member 90 may be used to prevent a downstream flow of resin out of the resin impregnation head. If impregnation head 60 is machined in separate upstream section 86 and downstream section 88, the two sections may be held together by bolts, tie rods or any other fastening means. Further, resilient member 90 is preferably used between the upstream and downstream sections and may take the form of a diaphragm, lip seal or similar structure.

Most preferably, the fiber bundles will not physically contact resilient members 90 but will be separated therefrom by an intermediate barrier of uncured resin on the fiber bundles. In addition, resilient members 90 may each have a variable bore which may be enlarged and reduced to control the clearances around the passing fiber bundles. Although the bores of resilient members 90 may be adjusted by any known means, it is anticipated that the resilient members may be inflatable and that a fluid may be introduced to inflate them, thereby reducing the inner diameter of the bore and decreasing the clearance between the passing fiber bundles and the resilient member.

As shown in FIG. 8, head 60 operates similarly to the impregnation device described above. Resin is introduced at resin inlet 72 and directed about mandrel 76. Since resin impregnation head 60 is cylindrical in cross section, resin may be introduced at various locations about the mandrel's circumference. The resin flow is introduced downstream of the inlet to the downstream chamber. Pressure within the downstream chamber is controlled to create an upstream flow of resin into the upstream chamber and sets up resin wall 84. Arrows in FIG. 8 depict the path of resin flow into and through the downstream chamber and into the upstream chamber.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for impregnating fiber bundles with resin comprising:
   an upstream chamber which receives a fiber bundle through a fiber inlet and provides a passage for conveying the fiber bundle to an orifice, wherein a substantial length of the upstream chamber is tapered toward the orifice, the orifice having a smaller cross sectional area than the fiber inlet and adapted to compress resin into the fiber bundle;
   a downstream chamber which receives the fiber bundle through the orifice and provides a passage for conveying the fiber bundle to a fiber outlet; and
   at least one resin conduit outlet located downstream of the orifice and directly adjacent to the orifice, the at least one resin conduit providing resin downstream to the downstream chamber and upstream to the upstream chamber through the orifice whereby the fiber bundle is impregnated with the resin in the upstream chamber and the downstream chamber as the fiber bundle is conveyed therethrough.

2. The apparatus of claim 1 wherein the downstream chamber tapers toward the fiber outlet.

3. The apparatus of claim 1 wherein the orifice has a rectangular cross-section.

4. The apparatus of claim 1 wherein cross sectional areas of the orifice and the fiber bundle are selected so that the cross sectional area of the fiber bundle fills 45%–70% of the cross sectional area of the orifice.

5. The apparatus of claim 1 wherein the fiber outlet further comprises means for adjusting a cross sectional area thereof.

6. The apparatus of claim 1 wherein the cross sectional area of the orifice and the cross sectional area of the fiber outlet have a ratio of 0.75–1.5:1.

7. The apparatus of claim 1 wherein the at least one resin conduit directs a resin flow at an acute angle in relation to the fiber bundle.

8. The apparatus of claim 1 wherein the fiber inlet the orifice, and the fiber outlet are adapted to receive a fiber bundle wound around a mandrel.

9. The apparatus of claim 8 further comprising:
   a resilient member located at the fiber outlet.

10. The apparatus of claim 9 wherein the resilient member is inflatable.

11. The apparatus of claim 9 wherein the resilient member does not physically contact the fiber bundles.

12. An apparatus for impregnating fiber bundles with resin comprising:
   an upstream chamber which receives a fiber bundle through a fiber inlet and provides a passage for conveying the fiber bundle to an orifice, wherein a substantial length of the upstream chamber is tapered toward the orifice, the orifice having a smaller cross sectional area than the fiber inlet and adapted to compress resin into the fiber bundle;
   a downstream chamber which receives the fiber bundle through the orifice and provides a passage for conveying the fiber bundle to a fiber outlet; and
   at least one resin conduit which provides resin to the upstream and downstream chambers whereby the fiber bundle is impregnated with the resin in the upstream chamber and the downstream chamber as the fiber bundle is conveyed therethrough;
   wherein the orifice comprises means for adjusting the cross sectional area thereof.

13. An apparatus for impregnating fiber bundles with resin comprising:

an upstream chamber which receives a fiber bundle through a fiber inlet and provides a passage for conveying the fiber bundle to an orifice, wherein a substantial length of the upstream chamber is tapered toward the orifice, the orifice having a smaller cross sectional area than the fiber inlet and adapted to compress resin into the fiber bundle;

a downstream chamber which receives the fiber bundle through the orifice and provides a passage for conveying the fiber bundle to a fiber outlet; and at least one resin conduit outlet located immediately downstream of the orifice and directly adjacent to the orifice, the at least one resin conduit providing resin upstream to the upstream chamber and downstream to the downstream chamber whereby the fiber bundle is impregnated with the resin in the upstream chamber and the downstream chamber as the fiber bundle is conveyed therethrough.

14. The apparatus of claim 13 wherein the downstream chamber tapers toward the fiber outlet.

15. The apparatus of claim 13 wherein the orifice has a rectangular cross section.

16. The apparatus of claim 13 wherein cross sectional areas of the orifice and the fiber bundle are selected so that the cross sectional area of the fiber bundle fills 45%–70% of the cross sectional area of the orifice.

17. The apparatus of claim 13 wherein the orifice further comprises means for adjusting the cross sectional area thereof.

18. The apparatus of claim 13 wherein the fiber outlet further comprises means for adjusting a cross sectional area thereof.

19. The apparatus of claim 13 wherein the cross sectional area of the orifice and the cross sectional area of the fiber outlet have a ratio of 0.75–1.5:1.

20. The apparatus of claim 13 wherein the at least one resin conduit directs a resin flow at an acute angle in relation to the fiber bundle.

21. The apparatus of claim 13 wherein the fiber inlet, the orifice, and the fiber outlet are adapted to receive a fiber bundle wound around a mandrel.

22. An apparatus for impregnating fiber bundles with resin comprising:

an upstream chamber which receives a fiber bundle wound around a mandrel through a fiber inlet and provides a passage for conveying the fiber bundle to an orifice;

a downstream chamber which receives the fiber bundle through the orifice and provides a passage for conveying the fiber bundle to a fiber outlet;

at least one resin conduit which provides resin to the upstream and downstream chambers whereby the fiber bundle is impregnated with the resin the upstream chamber and the downstream chamber as the fiber bundle is conveyed therethrough; and a resilient member located between the upstream and downstream chambers.

23. The apparatus of claim 22 wherein the resilient member is inflatable.

24. The apparatus of claim 22 wherein the resilient member does not physically contact the fiber bundles.

25. A resin impregnation head for fiber bundles comprising:

an upstream chamber which receives a fiber bundle through a fiber inlet and provides a passage for conveying the fiber bundle to a rectangular orifice, wherein a substantial length of the upstream chambered is tapered toward the orifice, the orifice having a smaller cross sectional area than the fiber inlet and adapted to compress resin into the fiber bundle;

means for adjusting the cross sectional area of the orifice;

a downstream, tapered chamber which receives the fiber bundle through the orifice and provides a passage for conveying the fiber bundle to a fiber outlet;

two resin conduits located immediately downstream of the orifice which direct a resin flow at an acute angle in relation to the fiber bundle; and a fiber outlet, wherein the fiber outlet further comprises means for adjusting a cross sectional area thereof so that the cross sectional area of the fiber outlet is equal to the cross sectional area of the orifice.

26. A resin impregnation head for fiber bundles comprising:

an upstream chamber which receives a fiber bundle wound around a mandrel through a fiber inlet and provides a passage for conveying the fiber bundle to a rectangular orifice, wherein a substantial length of the upstream chamber is tapered toward the orifice, the orifice having a smaller cross sectional area than the fiber inlet and adapted to compress resin into the fiber bundle;

means for adjusting the cross sectional area of the orifice;

an inflatable, resilient member located between the upstream and downstream chamber which does not physically contact the fiber bundle;

a downstream, tapered chamber which receives the fiber bundle through the orifice and provides a passage for conveying the fiber bundle to a fiber outlet, wherein the fiber outlet further comprises means for adjusting a cross sectional area thereof so that the cross sectional area of the fiber outlet is equal to the cross sectional area of the orifice;

two resin conduits located immediately downstream of the orifice which direct a resin flow at an acute angle in relation to the fiber bundle; and an inflatable, resilient member located at the fiber outlet which does not physically contact the fiber bundle.

27. An apparatus for impregnating fiber bundles with resin comprising:

an upstream chamber which receives a fiber bundle through a fiber inlet and provides a passage for conveying the fiber bundle to an orifice, wherein a substantial length of the upstream chamber is tapered toward the orifice, the orifice having a smaller cross sectional area than the fiber inlet and adapted to compress resin into the fiber bundle;

a downstream chamber which receives the fiber bundle through the orifice and provides a passage for conveying the fiber bundle to a fiber outlet;

an inflatable resilient member located at the fiber outlet; and at least one resin conduit outlet located downstream of the orifice which provides resin downstream to the downstream chamber and upstream to the upstream chamber through the orifice whereby the fiber bundle is impregnated with the resin in the upstream chamber and the downstream chamber as the fiber bundle is conveyed therethrough.

* * * * *